Dec. 15, 1942.    G. A. McFARLAND    2,304,945
STEERING WHEEL INSERT
Filed Aug. 2, 1940
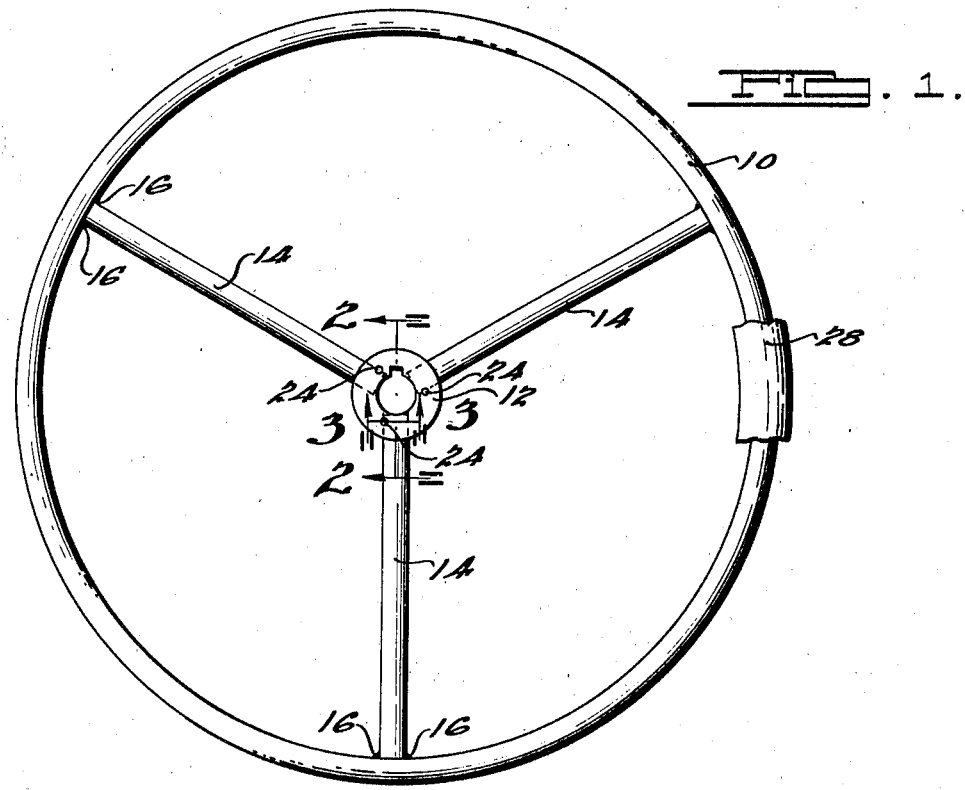
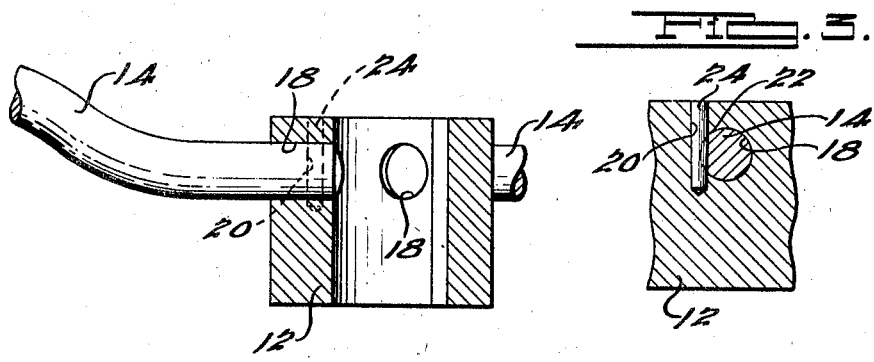
INVENTOR
George A. McFarland.
BY
Harness, Dickey & Pierce.
ATTORNEYS.

Patented Dec. 15, 1942

2,304,945

UNITED STATES PATENT OFFICE 2,304,945

STEERING WHEEL INSERT

George A. McFarland, Portland, Ind., assignor to Sheller Manufacturing Corporation, Portland, Ind., a corporation of Indiana Application August 2, 1940, Serial No. 349,608

3 Claims. (Cl. 74—552)

The present invention relates to vehicle steering wheels, and particularly relates to improved insert assemblies for such wheels.

One of the primary objects of the present invention is to provide an improved and simplified insert assembly for steering wheels which is rugged in character and which will stand up under the hard uses to which it is put.

A further object of the invention is to provide an improved insert assembly of the type mentioned having an improved connection between the spokes and the hub which is particularly adapted for heavy duty use, such as on tractors, trucks, or the like, where the wheel is subjected to hard vibrations and where the operator holds firmly to the rim of the wheel during such vibrations, thereby putting exceptional strain on the connections between the spokes and the hub.

Another object of the invention is to provide an improved insert assembly of the type mentioned which is susceptible to economical mass production.

Other objects of the invention will become apparent from the following specification, the drawing relating thereto, and from the claims hereinafter set forth.

In the drawing, in which like numerals are used to designate like parts in the several views throughout:

Figure 1 is a top plan view of a steering wheel insert assembly according to the present invention;

Fig. 2 is an enlarged, fragmentary cross-sectional view taken substantially along the line 2—2 of Fig. 1;

Fig. 3 is an enlarged, fragmentary cross-sectional view taken substantially along the line 3—3 of Fig. 1.

It will be appreciated that steering wheels, particularly those used on tractors and trucks, are subjected to very hard use in that the steering wheels vibrate considerably when such vehicles pass over comparatively rough ground. The operators of such vehicles brace themselves by hanging on to the rim of the wheel so that considerable stress is placed upon the connections between the spokes and the hub. In the past such connections have been made by welding the spokes to the hub, but it has been found that such connections fail due to fatigue. According to the present invention such connection is made in a novel and improved manner so that such failure does not occur. Furthermore, the construction of the present invention is simple so that it may satisfy the demands of economical mass production.

Referring to the drawing, a metal steering wheel insert assembly is illustrated which comprises an annular rim 10 formed of circular bar stock. Such rim 10 is connected to a central hub member 12 by means of spokes 14. Such spokes 14 are preferably formed of circular bar stock and have their outer ends welded to the rim 10, as indicated at 16.

In the embodiment illustrated, there are three of such spokes shown which extend radially of the rim, but it will be appreciated that the number of such spokes may be varied within the scope of the present invention. The present invention is primarily concerned with the manner by which the inner ends of the spokes are connected to the hub 12.

According to the present invention, such connection includes the provision of apertures 18 within the hub 12. Such apertures extend inwardly toward the longitudinal axis of the hub, and in the particular embodiment illustrated are shown to extend radially inwardly. Such apertures 18 are complementary in shape to the shape of the inner ends of the spokes 14 so that such inner ends are tightly received within the apertures 18.

Other apertures 20 are provided in the hub 12, and such other apertures extend axially of the hub, intersect portions of the adjacent apertures 18 and extend therebelow, as best shown in Fig. 3. Such apertures 20 are formed by drilling through one of the ends of the hub 12 after the inner ends of spokes 14 are disposed within apertures 18. It will therefore be appreciated that by such operation portions of the inner ends of rod members 14 are removed, as indicated at 22. Dowels or pin members 24 of substantially the same length as apertures 20 are driven into apertures 20 in tight engagement with the walls thereof so that portions of such pin members 24 extend across portions of apertures 18 within the removed portions 22 of the spokes 14. The spokes 14 are thus pinned or securely fixed to the hubs 12 so that the connection between the spokes and the hub is rugged and will not fail under the hard use to which the wheel is put.

It will be appreciated that the elements forming the insert assembly, such as the rim 10 and the spokes 14, may be covered with a suitable material, such as one of the plastics or rubber, as partially shown at 28, in accordance with conventional practice.

Formal changes may be made in the specific embodiment of the invention described without departing from the spirit and substance of the broad invention, the scope of which is commensurate with the appended claims.

What is claimed is:

1. In a steering wheel comprising a hub and a spoke, a connection between the hub and spoke, said connection comprising an aperture formed in said hub extending inwardly toward the axis of said hub, the inner end of said spoke being tightly received within said aperture, another aperture formed in said hub intersecting a portion only of said first-named aperture and having the inner end thereof closed, a portion of the inner end of said spoke within said first-named aperture being removed so that such removed portion is aligned with said another aperture to form a continuation of the wall thereof, and a pin member complementary in cross-sectional configuration to the cross-sectional configuration of said another aperture tightly received within said another aperture and within said removed portion and securely engaging said spoke and said hub to thereby secure said spoke against axial movement with respect to said first-named aperture.

2. In a steering wheel comprising a hub and a spoke, a connection between the hub and spoke, said connection comprising an aperture formed in said hub extending inwardly toward the axis of said hub, the inner end of said spoke being tightly received within said aperture, another aperture formed in said hub intersecting a portion only of said first-named aperture, a portion adjacent the inner end of the spoke within said first-named aperture being removed at a space inwardly of the end thereof so that such removed portion is aligned with said another aperture and forms a continuation of the wall thereof, and a pin member of substantially circular cross-section tightly received within said another aperture securely engaging a portion of said spoke within said first-named aperture, to thereby secure said spoke against axial movement with respect to said first-named aperture.

3. In a steering wheel comprising a hub and a spoke, a connection between the hub and spoke, said connection comprising an aperture formed in said hub extending inwardly toward the axis of said hub, the inner end of said spoke being tightly received within said aperture, another aperture formed in said hub intersecting said first-named aperture, a portion adjacent the inner end of said spoke within said first-named aperture and spaced inwardly of the end thereof being removed so that such removed portion is aligned with said another aperture and forms a continuation of the wall thereof, and a pin member tightly received within said another aperture and within said removed portion securely engaging said spoke and said hub to thereby secure said spoke against axial movement with respect to said first-named aperture.

GEORGE A. McFARLAND.